(12) United States Patent
Shiroyama et al.

(10) Patent No.: US 8,561,547 B2
(45) Date of Patent: Oct. 22, 2013

(54) TRACK GUIDED VEHICLE WHEEL TRUCK

(75) Inventors: Mihoko Shiroyama, Mihara (JP); Yoshiki Okubo, Mihara (JP); Kousuke Katahira, Kawasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 28 days.

(21) Appl. No.: 13/258,992

(22) PCT Filed: Aug. 25, 2009

(86) PCT No.: PCT/JP2009/064758
§ 371 (c)(1),
(2), (4) Date: Sep. 22, 2011

(87) PCT Pub. No.: WO2010/109691
PCT Pub. Date: Sep. 30, 2010

(65) Prior Publication Data
US 2012/0012028 A1   Jan. 19, 2012

(30) Foreign Application Priority Data
Mar. 25, 2009   (JP) .................. 2009-073952

(51) Int. Cl.
*B61F 5/38*   (2006.01)
*B61F 5/52*   (2006.01)

(52) U.S. Cl.
USPC ............ 105/215.2; 105/215.1; 105/77.2; 105/165; 105/144; 104/245; 104/119; 104/246

(58) Field of Classification Search
USPC .......... 105/72.2, 215.1, 215.2, 199.1, 168, 105/144, 167; 104/242, 243, 245, 118, 119, 104/120, 124, 130.07, 248, 307, 165, 167, 104/246, 247
See application file for complete search history.

(56) References Cited

U.S. PATENT DOCUMENTS 4,267,779 A   5/1981   Binder
4,346,659 A   8/1982   Binder
(Continued)

FOREIGN PATENT DOCUMENTS

CN   86104770 A   11/2008
GB      851256 A   10/1960
(Continued)

OTHER PUBLICATIONS

TW Office Action dated Nov. 23, 2011 corresponding to TW patent application No. 098128557.
(Continued)

*Primary Examiner* — Mark Le
(74) *Attorney, Agent, or Firm* — Lowe, Hauptman & Ham

(57) ABSTRACT

A track-guided vehicle wheel truck facilitates vehicle maintenance and enables reduction in costs. The track vehicle wheel truck includes guide frames arranged along the forward and rearward directions of the vehicle on the inside of the vehicle width direction in the running wheels, and fixed to knuckles; a tie rod arranged on the center side of the forward and rearward directions in the vehicle along the vehicle width direction, and interlock with the guide frames; guide wheel receivers disposed toward the inside of the vehicle width direction from the guide frames on the vehicle end side and the center side relative to an axis of the running wheels; and a steering axle arranged along the vehicle width direction, and are able to turn the running wheels, the knuckles, and the guide frames by installing a kingpin at both ends thereof.

4 Claims, 7 Drawing Sheets

(56) References Cited

U.S. PATENT DOCUMENTS

| | | | |
|---|---|---|---|
| 4,436,170 A | 3/1984 | Mehren et al. | |
| 6,308,640 B1 * | 10/2001 | Weule et al. | 105/72.2 |
| 6,477,963 B1 | 11/2002 | Weule et al. | |
| 7,644,664 B2 | 1/2010 | Nakao et al. | |

FOREIGN PATENT DOCUMENTS

| | | | |
|---|---|---|---|
| JP | 45-12884 | | 5/1970 |
| JP | 53-23416 | A | 3/1978 |
| JP | 54-64315 | A | 5/1979 |
| JP | 55-55052 | A | 4/1980 |
| JP | 57-125673 | U | 8/1982 |
| JP | 58-81857 | A | 5/1983 |
| JP | 60020454 | U | 2/1985 |
| JP | 64-25959 | U | 2/1989 |
| JP | 6425959 | | 2/1989 |
| JP | 1-27492 | Y2 | 8/1989 |
| JP | 1-249567 | A | 10/1989 |
| JP | 2-91070 | U | 7/1990 |
| JP | 4-358905 | A | 12/1992 |
| JP | 5-338534 | A | 12/1993 |
| JP | 11278004 | A | 10/1999 |
| JP | 2001-48008 | A | 2/2001 |
| JP | 200148008 | A | 2/2001 |
| JP | 2004-122806 | A | 4/2004 |
| JP | 2008-265569 | A | 11/2008 |
| JP | 4225026 | B | 12/2008 |
| TW | 200526507 | | 8/2005 |

OTHER PUBLICATIONS

Office Action corresponding to JP2009-073952 dated Jan. 20, 2012.
International Search Report for PCT/JP2009/064758 mailed Nov. 24, 2009.
A JP Office Action, dated Sep. 7, 2012, issued in JP Application No. 2009-073952.
Notice of Allowance issued by the Taiwanese Patent Office in corresponding Taiwan Application No. 098128557, dated Dec. 10, 2012.
Official Notice of Allowance issued in JP 2009-073952 dispatch date May 17, 2013.
Office Action dated Jul. 24, 2013 issued in Chinese Patent Application No. 200980158178.6.

* cited by examiner

TRACK GUIDED VEHICLE WHEEL TRUCK

RELATED APPLICATIONS

The present application is a National Phase of International Application Number PCT/JP2009/064758, filed Aug. 25, 2009 and claims priority from, Japanese Application Number 2009-073952, filed Mar. 25, 2009.

TECHNICAL FIELD

The present invention relates to a track-guided vehicle wheel truck (bogie) that runs along a track.

BACKGROUND ART

In general, a track-guided vehicle (hereinafter, referred to as a "vehicle"), such as a subway car and a new transportation system vehicle, runs along a track while being guided by a guide rail arranged along the track. A wheel truck of such a vehicle is provided with a steering mechanism or the like for steering running wheels so that the running wheels are tilted so as to follow the guide rail when running on a curve. For conventional vehicles, a side guide system has been primarily used, in which the guide rail is arranged on the outside of the vehicle width direction of the vehicle. However, for recent vehicles, because of the demand for compactness of track construction, a center guide system has been widely used in which the guide rail is arranged at the center of the vehicle width direction of the vehicle.

An example of a center guide system vehicle having the above-described steering mechanism has been disclosed in Patent Literature 1. In Patent Literature 1, two running wheels are connected to each other by an axle, two guide wheels are provided on the front side and the rear side of vehicle respectively relative to the axle, and guide arms for supporting the guide wheels are arranged along the front and rear direction of the vehicle. One end of this guide arm is turnably attached to the axle of the running wheels, and the other end thereof is turnably mounted with the guide wheel. Furthermore, between an intermediate part of the guide arm and the end part in the vehicle width direction of the axle, a link mechanism is provided, which is formed so that the guide arm and the axle can be interlocked with each other by a plurality of arms. According to this feature, when the vehicle travels along a curved guide rail, if the guide wheels are moved by a force which is received from the guide rail, the running wheels which interlock with the guide wheels are steered so as to move a distance of a gap between the rear guide wheel and the guide rail corresponding to the curved guide rail.

Furthermore, an example of a center guide system vehicle, having a steering mechanism that can be controlled by an actuator, has been disclosed in Patent Literature 2. In Patent Literature 2, two running wheels on the identical axis are enabled to be turned by a kingpin, are connected to each other by an axle extending in the vehicle width direction, and are enabled to be interlocked with each other by a tie rod arranged along the vehicle width direction. On the other hand, the guide wheels guided by the guide rail are attached to a guide frame, and the guide frame is enabled to be turned around the center position between the paired running wheels relative to the axle. A steering rod for steerably connecting one of the paired running wheels to the guide frame, is disposed along the vehicle width direction. One end of this steering rod is attached to a steering arm for steering one of the paired running wheels, and the other end thereof is attached to the guide frame so as to be movable in the front and rear direction of the vehicle. In addition, an actuator that is extensible and retractable in the forward and rearward directions of the vehicle is provided on the guide frame, and the other end on the guide frame side of the steering rod is attached to the actuator. By the movement of the other end of the steering rod along with the operation of the actuator, the distance between the other end of the steering rod and the turning center of the guide frame (or the axle) is changed relative to the distance between one end on the running wheel side of the steering rod and the axle, so that the steering rod adopts a posture tilting relative to the axle. As a result, the displacement of the steering arm changes with the movement of the steering rod, and thus the running wheels are steered by the steering arm.

CITATION LIST

Patent Literature

Patent Literature 1: Japanese Examined Utility Model Application Publication No. 501-027492
Patent Literature 2: U.S. Pat. No. 6,477,963

SUMMARY OF INVENTION

Technical Problem

In particular, for a vehicle for transporting passengers, such as a subway car and a new transportation system vehicle, since the vehicle is repeatedly used continuously for a long time, it is necessary to perform maintenance work on the wheel trucks thereof easily and in a short time. Therefore, mainly at the maintenance work site, it is necessary to simplify the structure of vehicle wheel truck, and to facilitate the maintenance work.

However, in the wheel truck in Patent Literature 1, since the link mechanism which is used is operated in a complicated manner by the plurality of arms or the like, the structure thereof is complicated. Furthermore, for the wheel truck in Patent Literature 2 as well, since the structure for turning the guide frame which is mounted with the guide wheels relative to the axle, and the structure for steering the running wheels by controlling the steering rod by the actuator, are combined, the structure thereof is complicated. The wheel truck having such a complicated structure has problems in that the maintenance work is difficult to perform, and in that the work is difficult to complete in a short time. These problems lead to an increase in maintenance costs. In addition, the complication of vehicle structure leads to an increase in vehicle manufacturing costs.

The present invention has been made in view of the above circumstances, and accordingly, an object thereof is to provide a track vehicle wheel truck that facilitates vehicle maintenance work and enables a reduction in cost by simplifying the structure thereof while enabling the steering of running wheels along a guide rail.

Solution to Problem

To achieve the above object, the present invention provides a track vehicle wheel truck including a pair of running wheels provided on the identical axis; knuckles, each enabled to be turned by a kingpin, and mounted with the pair of running wheels; guide wheels rolling along the side surface of the vehicle width direction in a center guide which is positioned in the middle of the vehicle width direction relative to the pair of running wheels on a running track; guide frames each arranged along the forward and rearward directions of the vehicle on the inside of the vehicle width direction in the running wheel, and fixed to the knuckle; a tie rod arranged on the center side of the forward and rearward directions of the vehicle along the vehicle width direction, and interlock with the guide frames; guide wheel receivers disposed toward the inside of the vehicle width direction from the guide frames on the vehicle end side and the center side relative to the axis of the running wheels; and a steering axle arranged along the vehicle width direction, and enabled to turn the running wheels, the knuckles, and the guide frames by installing the kingpin at both ends thereof, and the guide wheels each are installed in the distal end part on the inside of the vehicle width direction in the guide wheel receiver.

Regarding the track vehicle wheel truck according to the present invention, the guide wheel receiver is attached to the guide frame so as to be turnable.

Regarding the track vehicle wheel truck according to the present invention, a restoration rod is provided along the vehicle width direction, one end of the restoration rod is attached to the guide frame, and the other end of the restoration rod is attached to the steering axle. Furthermore, a horizontal damper is provided along the vehicle width direction, one end of the horizontal damper is attached to the guide frame, and the other end of the horizontal damper is attached to the steering axle.

Regarding the track vehicle wheel truck according to the present invention, a distance between the steering axle and the turn axis of the guide wheel on the vehicle end side, is longer than a distance between the steering axle and the turn axis of the guide wheel on the center side.

Advantageous Effects of Invention

According to the present invention, the effects described below can be achieved. The track vehicle wheel truck according to the present invention includes a pair of running wheels provided on the identical axis; knuckles, each enabled to be turned by the kingpin, and mounted with the pair of running wheels; and the guide wheels rolling along the side surface of the vehicle width direction in the center guide which is positioned in the middle of the vehicle width direction relative to the pair of running wheels on the running track; the guide frames each arranged along the forward and rearward directions of the vehicle on the inside of the vehicle width direction in the running wheel, and fixed to the knuckle; the tie rod arranged on the center side in the front and rear direction of the vehicle along the vehicle width direction, and interlock with the guide frames; the guide wheel receivers disposed toward the inside of the vehicle width direction from the guide frames on the vehicle end side and the center side relative to the axis of the running wheels; and the steering axle arranged along the vehicle width direction, and enabled to turn the running wheels, the knuckles, and the guide frames by installing the kingpin at both ends thereof, and the guide wheels are each installed in the distal end part on the inside of the vehicle width direction in the guide wheel receiver.

Therefore, in the case in which the track vehicle wheel trucks each having the above described simple structure are provided on the front side and the rear side of vehicle, the operation and effects described below can be obtained.

Regarding the track vehicle wheel truck on the front side, which is located on the travel direction side, when the vehicle goes to a curved center guide, the guide wheels on the curve inside move toward the outside relative to the curve and come into contact with the center guide. At this time, a reaction force directed to the curve inside acts on the guide wheels on the curve inside from the center guide. In the curve inside, this reaction force acts on the guide wheel receiver and the guide frame from the guide wheel, so that the guide wheel receiver and the guide frame turn to the curve inside corresponding to the curve, and the running wheel tilts to the curve inside corresponding to the curve. Furthermore, the tie rod is moved by the turning of the guide frame on the curve inside. The guide frame on the curve outside turns in the same manner interlocking with the guide frame on the curve inside, and the running wheel on the curve outside also tilts to the curve inside corresponding to the curve. Therefore, the paired running wheels are steered so as to tilt along the center guide.

On the other hand, in the track vehicle wheel truck on the rear side, when the vehicle goes to the curved center guide, the guide wheels on the curve outside move toward the inside relative to the curve and come into contact with the center guide. At this time, a reaction force directed to the curve outside acts on the guide wheels on the curve outside from the center guide. In the curve outside, this reaction force acts on the guide wheel receiver and the guide frame from the guide wheel, so that the guide wheel receiver and the guide frame turn to the curve outside corresponding to the curve, and the running wheel tilts to the curve outside corresponding to the curve. Furthermore, the tie rod is moved by the turning of the guide frame on the curve outside. The guide frame on the curve inside turns in the same manner interlocking with the guide frame on the curve outside, and the running wheel on the curve inside also tilts to the curve outside corresponding to the curve. Therefore, the paired running wheels are steered so as to tilt along the center guide.

As described above, the running wheels can be steered along the center guide, and the track vehicle body is configured as a simple structure. This simple structure achieves a reduction in vehicle manufacturing cost, facilitates vehicle maintenance work, and achieves a reduction in maintenance costs.

Regarding the track vehicle wheel truck according to the present invention, the guide wheel receiver is turnably attached to the guide frame, the guide wheel is configured so as to be changeable corresponding to either of the center guide system guide rail and the side guide system guide rail. Therefore, different vehicles need not be manufactured separately for the center guide system and the side guide system, and therefore the vehicle manufacturing cost can be reduced. The vehicle can be configured so that, for example, on an ordinary running path, the track vehicle wheel truck is guided by the center guide, and on the other hand, in a depot, the track vehicle wheel truck is guided by the side guides. In this case, for an ordinary running path over a long distance, since this system does not require a large installation space, the center guide system can achieve a reduction in guide installation costs. On the other hand, in the depot, the center guide, which is provided along the forward and rearward directions just under the vehicle center, is unnecessary, and the guide wheel receivers and the guide wheels are positioned on the outside in the vehicle width direction from the lower part of the wheel truck. Therefore, when a worker performs maintenance work under the vehicle body, the guide wheel receivers and the guide wheels are less liable to interfere with the work. As a result, the maintenance work is easier, and therefore the maintenance costs are reduced.

On the track vehicle wheel truck according to the present invention, the restoration rod is provided along the vehicle width direction, one end of the restoration rod is attached to the guide frame, and the other end of the restoration rod is attached to the steering axle. Furthermore, the horizontal damper is provided along the vehicle width direction, one end of the horizontal damper is attached to the guide frame, and the other end of the horizontal damper is attached to the steering axle. Therefore, during straight running, the turning of the paired right and left guide frames, which are interlocked with each other, is restrained by the restoration rod and the horizontal damper, and the turning of the running wheels is also restrained. The performance of straight running of the vehicle is thereby enhanced, and vibrations of the vehicle are restrained.

Regarding the track vehicle wheel truck according to the present invention, the distance between the steering axle and the turn axis of the guide wheel on the vehicle end side is longer than the distance between the steering axle and the turn axis of the guide wheel on the center side, when running on a curve, the running wheels tilt in the state in which the slip angle is generated. Therefore, even on the track vehicle wheel truck having such a simple structure, when running on a curve, a guide wheel working force which is directed to the guide rail of the guide wheel, can be decreased by a cornering force generated on the paired running wheels, and the contact pressure of the guide wheel and the guide rail can be decreased. Wear and deterioration of the guide wheels and the guide rail can thereby be reduced.

DESCRIPTION OF EMBODIMENTS

Wheel trucks used for a track-guided vehicle (hereinafter referred to as a "vehicle") according to first to fifth embodiments of the present invention will now be described. In the first to fifth embodiments of the present invention, as one example of the vehicle, a vehicle which is provided with wheel trucks at the front side and the rear side thereof, is used in the explanation below, and the explanation is given taking the vehicle travel direction as the vehicle front.

First Embodiment

Figure 1:
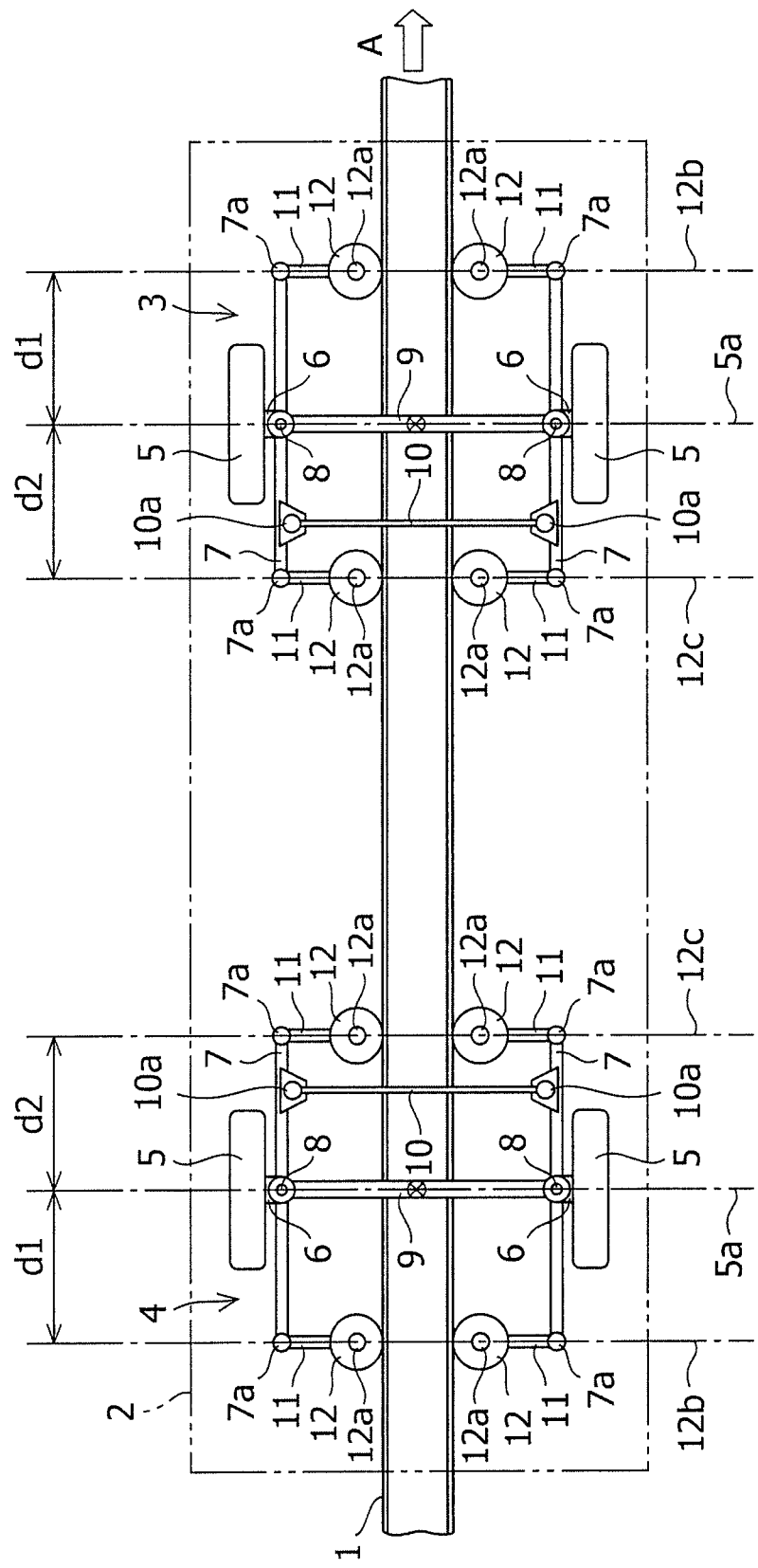
FIG. 1 is a schematic plan view showing a track vehicle that is running straight in a first embodiment of the present invention.

A vehicle wheel truck according to the first embodiment of the present invention is explained below. Referring to FIG. 1, in a vehicle traveling in the direction indicated by the arrow mark A, a center guide 1 is arranged along a track path of vehicle in the middle of the vehicle width direction in vehicle. The vehicle runs while being guided along the center guide 1. In such a vehicle, under a vehicle body 2, a front wheel truck 3 at the front side of vehicle and a rear wheel truck 4 at the rear side thereof are arranged. In the front wheel truck 3 at the front side and the rear wheel truck 4 at the rear side (hereinafter referred to as "wheel trucks 3 and 4"), two running wheels 5 are provided. As one example of this running wheel 5, mainly in a subway car or a new transportation system vehicle, and the like, a rubber tire is used. As another example of the running wheel 5, a wheel made of any other material, such as a steel wheel, may be used. The above-described paired running wheels 5 are able to turn around the identical axis 5a, and are arranged at intervals in the vehicle width direction.

In the inside of the vehicle width direction in the running wheels 5, knuckles 6 for attaching the paired running wheels 5 to the wheel trucks 3 and 4, are disposed on axes 5a of the running wheels 5. In each of the wheel trucks 3 and 4, a right guide frame 7 and a left guide frame 7 are provided in the vehicle width direction. The guide frame 7 is arranged along the forward and rearward directions of the vehicle at the inside of the vehicle width direction in the running wheel 5 and the knuckle 6. The guide frame 7 is mounted with the knuckle 6, and a kingpin 8 is disposed in the mounting part of the knuckle 6 to the guide frame 7.

A steering axle 9 connecting the paired guide frames 7 to each other is arranged along the vehicle width direction, and the kingpin 8 is mounted with both end parts of the steering axle 9. Therefore, the steering axle 9 can turn relative to the running wheel 5, the knuckle 6, and the guide frame 7. The wheel trucks 3, 4 are respectively provided with a tie rod 10 for interlocking the paired guide frames 7 with each other. The tie rod 10 is arranged along the vehicle width direction on the center side of vehicle relative to the steering axle 9, and both end parts 10a of the tie rod 10 are turnably attached to the paired guide frames 7.

In end parts 7a in the front and rear direction of the guide frame 7, a guide wheel receiver 11 is provided. The guide wheel receiver 11 is attached to the end part 7a in the front and rear direction of the guide frame 7, and is arranged so as to be directed from the end part 7a to the inside of the vehicle width direction. On the other hand, in the distal end part on the inside of the vehicle width direction in the guide wheel receiver 11, a guide wheel 12 is installed so as to be rollable along the guide frame 1 with a turn axis 12a being the center. Therefore, the guide wheel 12 is guided along the guide frame 1. The turn axes 12a of the paired guide wheels 12 on the vehicle end side of the forward and rearward directions in the vehicle, are positioned on an axis 12b shifting through a distance d1 from the steering axle 9 to the vehicle end side, and the turn axes 12a of the paired guide wheels 12 on the center side of the forward and rearward directions in the vehicle, are positioned on an axis 12c shifting through a distance d2 from the steering axle 9 to the center side. The distance d1 and the distance d2 are equal to each other (d1=d2).

Figure 2:
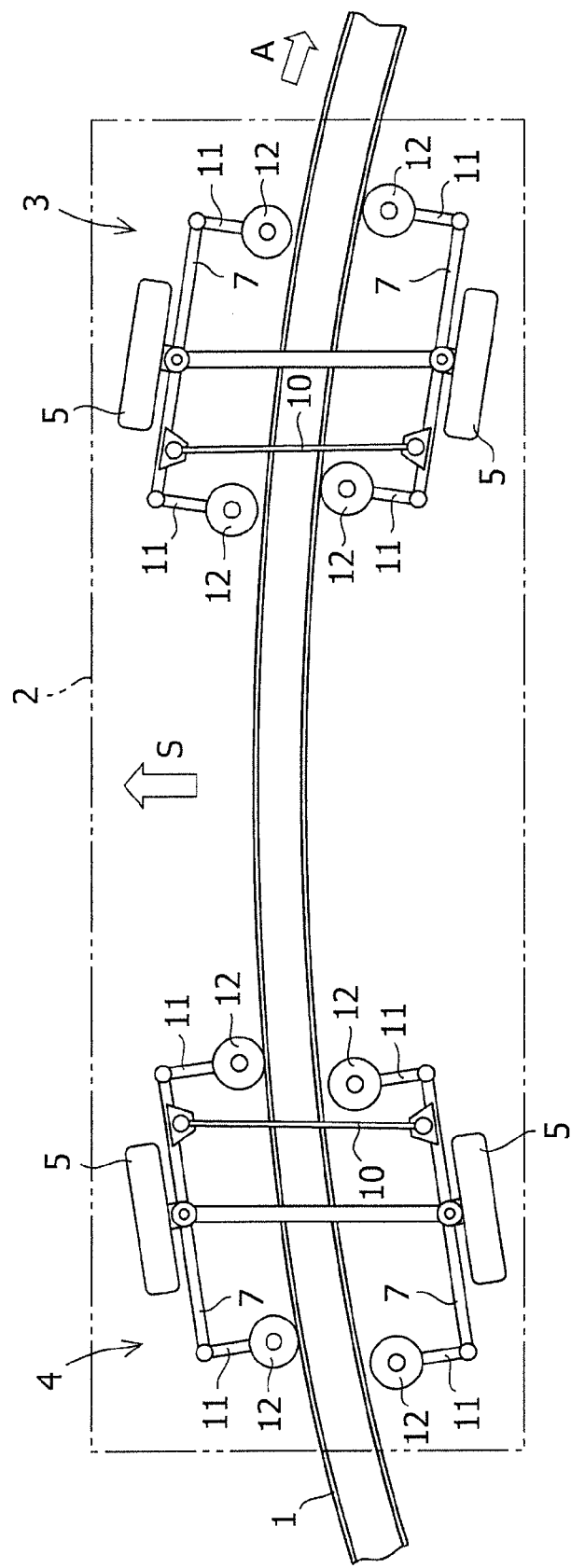
FIG. 2 is a schematic plan view showing a track vehicle that is running on a curve in a first embodiment of the present invention.

The operation of the above described wheel trucks 3, 4 of the first embodiment when running on a curve, is explained with reference to FIG. 2.

On the front wheel truck 3 on the travel direction side, when the vehicle goes to the curved center guide 1, the guide wheels 12 on the curve inside are moved toward the outside relative to the curve by an influence of, for example, a centrifugal force (indicated by the arrow mark S) acting on the vehicle. The guide wheels 12 come into contact with the center guide 1 on the curve inside. At this time, a reaction force directed to the curve inside acts on the guide wheel 12 on the vehicle end side and the guide wheel 12 on the center side from the center guide 1. In the curve inside, this reaction force acts on the guide wheel receiver 11 and the guide frame 7 from the guide wheel 12, so that the guide wheel receiver 11 and the guide frame 7 turn to the curve inside corresponding to the curve, and the running wheel 5 tilts to the curve inside corresponding to the curve. Furthermore, the tie rod 10 is moved by the turning of the guide frame 7 on the curve inside. The guide frame 7 on the curve outside turns in the same manner, interlocking with the guide frame 7 on the curve inside, and the running wheel 5 on the curve outside also tilts to the curve inside corresponding to the curve. Therefore, the paired running wheels 5 are steered so as to tilt along the center guide 1.

On the other hand, in the rear wheel truck 4, when the vehicle goes to the curved center guide 1, the guide wheels 12 on the curve outside are moved toward the inside relative to the curve by the influence of, for example, a centrifugal force (indicated by the arrow mark S) acting on the vehicle, and come into contact with the center guide 1. At this time, a reaction force directed to the curve outside acts on the guide wheel 12 on the vehicle end side and the guide wheel 12 on the center side from the center guide 1. On the curve outside, this reaction force acts on the guide wheel receiver 11 and the guide frame 7 from the guide wheel 12, so that the guide wheel receiver 11 and the guide frame 7 turn to the curve outside corresponding to the curve, and the running wheel 5 tilts to the curve outside corresponding to the curve. Furthermore, the tie rod 10 is moved by the turning of the guide frame 7 on the curve outside. The guide frame 7 on the curve inside turns in the same manner interlocking with the guide frame 7 on the curve outside, and the running wheel 5 on the curve inside also tilts to the curve outside corresponding to the curve. Therefore, the paired running wheels 5 are steered so as to tilt along the center guide 1.

As described above, according to the first embodiment of the present invention, the running wheels 5 can be steered along the center guide 1, and the wheel trucks 3, 4 are respectively configured so as to have a simple structure. This simple structure achieves a reduction in vehicle manufacturing costs, facilitates the vehicle maintenance work, and achieves a reduction in maintenance costs.

Second Embodiment

A vehicle wheel truck according to the second embodiment of the present invention is explained below. The basic features of the vehicle in the second embodiment are the same as those of the vehicle in the first embodiment. The explanation is given applying the same symbols and names to elements that are essentially the same as those in the first embodiment. Hereunder, the features different from those in the first embodiment are explained.

Figure 3:
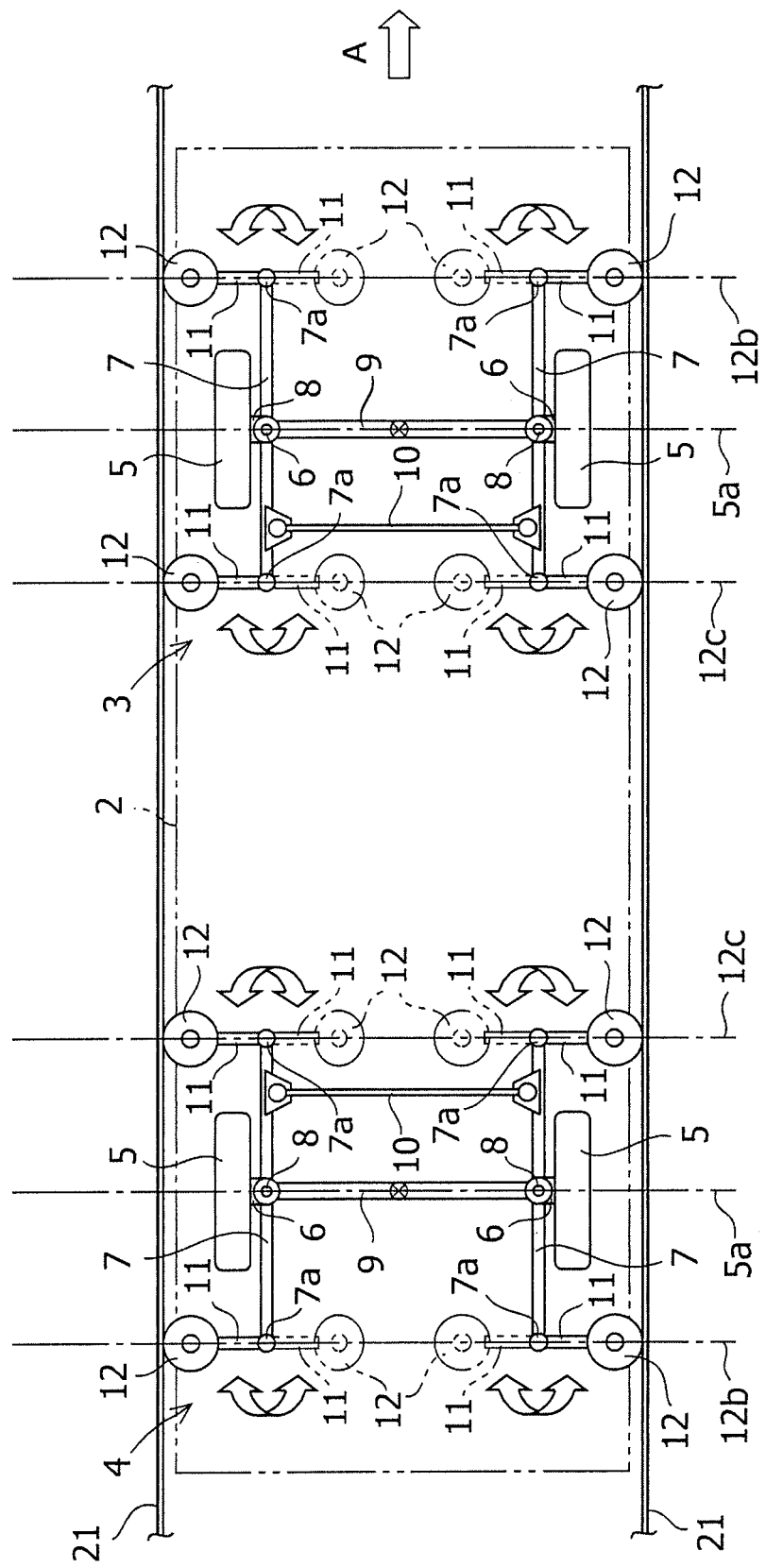
FIG. 3 is a schematic plan view showing a track vehicle that is running straight in a second embodiment of the present invention.

Referring to FIG. 3, the proximal end part on the outside of the vehicle width direction in the guide wheel receiver 11, is turnably attached to the end part of the front and rear direction in the guide frame 7. Therefore, the guide wheel receiver 11 and the guide wheel 12 can be changed from the state indicated by the broken line to the state turned 180° indicated by the solid line. Furthermore, side guides 21 are arranged along the track path on the outside of the vehicle width direction relative to the vehicle, and in the state indicated by the solid line, the guide wheels 12 are rollable along the side guides 12. In this case, the vehicle can run while being guided along the side guides 21. On the other hand, in the state indicated by the broken line, as in the first embodiment shown in FIG. 1, the guide wheels 12 are rollable along the center guide 1. In this case as well, the vehicle can run while being guided along the center guide 1.

As described above, according to the second embodiment of the present invention, the guide wheel 12 is able to be changed to either the center guide system guide rail and the side guide system guide rail. Therefore, the vehicle need not be manufactured separately corresponding to the center guide system and the side guide system, and furthermore the vehicle manufacturing costs can be reduced. In addition, the vehicle can be configured so that, for example, on an ordinary running path, the vehicle wheel truck is guided by the center guide 1, and on the other hand, in a depot, the vehicle wheel truck is guided by the side guides 21. In this case, for an ordinary running path over a long distance, since this system does not require a large installation space, the center guide system can achieve a reduction in guide installation cost. On the other hand, in the depot, the center guide provided along the front and rear direction just under the vehicle center is unnecessary, and the guide wheel receivers 11 and the guide wheels 12 are positioned on the outside of the vehicle width direction from the lower part of the wheel trucks 3, 4. Therefore, when a worker performs maintenance work under the vehicle body 2, the guide wheel receivers 11 and the guide wheels 12 are less liable to disturb the work. As a result, the maintenance work becomes easier, and therefore the maintenance cost is reduced.

Third Embodiment

A vehicle wheel truck according to the third embodiment of the present invention is explained below. The basic features of the vehicle in the third embodiment are the same as those of the vehicle in the first or second embodiment. The explanation is given applying the same symbols and names to elements that are essentially the same as those in the first and second embodiments. Hereunder, the features different from those in the first and second embodiments are explained.

Figure 4:
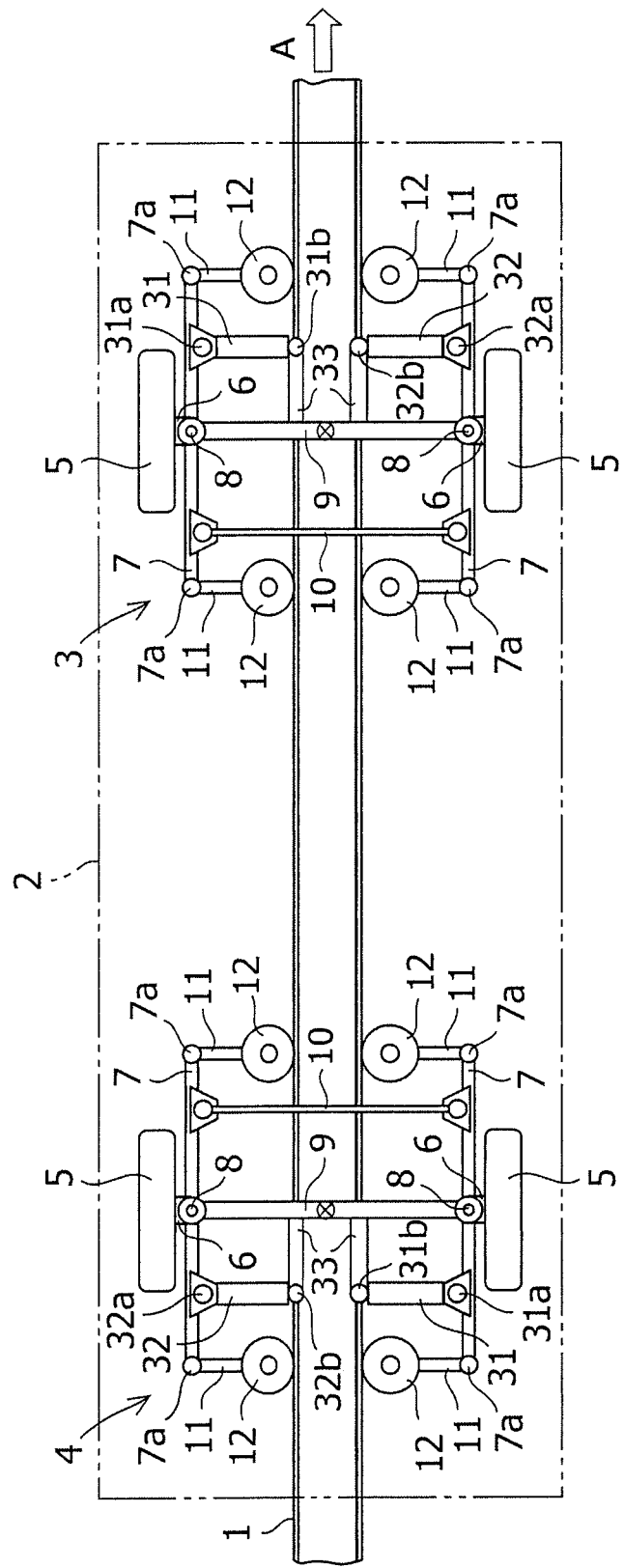
FIG. 4 is a schematic plan view showing a track vehicle that is running straight in a third embodiment of the present invention.

Referring to FIG. 4, the wheel trucks 3, 4 are provided with a restoration rod 31 and a horizontal damper 32, respectively. The restoration rod 31 and the horizontal damper 32 are arranged along the identical axis extending in the vehicle width direction on the vehicle end side from the steering axle 9. In addition, in order to install the above described restoration rod 31 and horizontal damper 32, a pair of mounting arms 33 extending to the vehicle end side, are provided on the steering axle 9 with a space being provided in the vehicle width direction so as to hold the central part in the vehicle width direction of the steering axle 9 therebetween. One end part 31a of the restoration rod 31 is turnably attached to one of the paired guide frames 7, and the other end part 31b thereof is turnably attached to the mounting arm 33 on one side of the paired guide frames 7. One end part 32a of the horizontal damper 32 is turnably attached to the other of the paired guide frames 7, and the other end part 32b thereof is turnably attached to the mounting arm 33 on the other side of the paired guide frames 7.

As described above, according to the third embodiment of the present invention, at the time of straight running, the turning of the paired right and left guide frames 7, which are interlocked with each other, is restrained by the restoration rod 31 and the horizontal damper 32, and furthermore the turning of the running wheels 5 is also restrained. The performance of straight running in vehicle is thereby enhanced, and vibrations of the vehicle are restrained.

Fourth Embodiment

A vehicle wheel truck according to the fourth embodiment of the present invention is explained below. The basic features of the vehicle in the fourth embodiment are the same as those of the vehicle in the first or second embodiment. The explanation is given applying the same symbols and names to elements that are essentially the same as those in the first and second embodiments. Hereunder, the features different from those in the first and second embodiments are explained.

Figure 5:
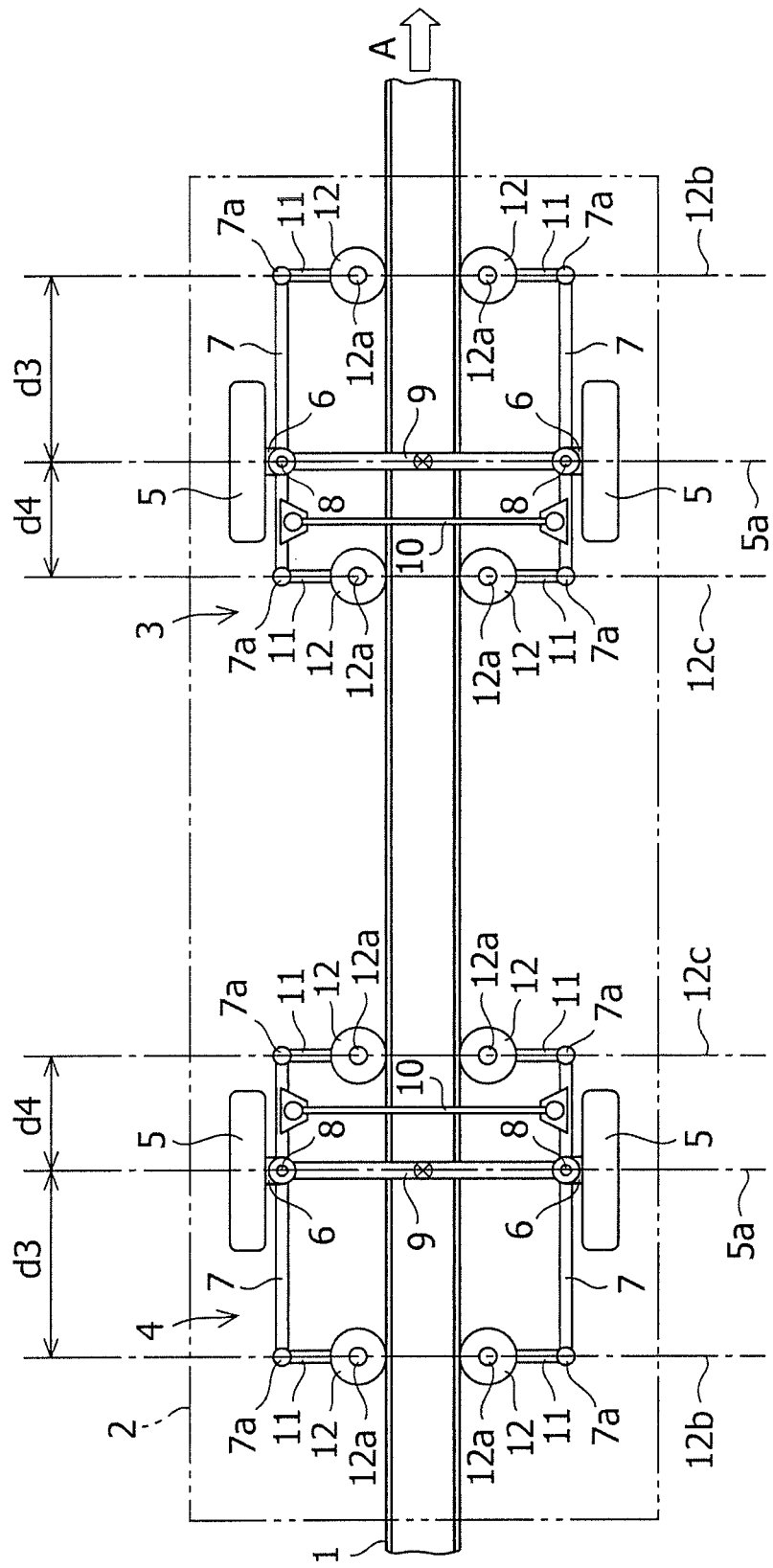
FIG. 5 is a schematic plan view showing a track vehicle that is running straight in a fourth embodiment of the present invention.

Referring to FIG. 5, the paired guide wheels 12 arranged on the vehicle end side of the steering axle 9 are arranged along the axis 12b extending in the vehicle width direction, and the paired guide wheels 12 arranged on the center side of the steering axle 9 are arranged along the axis 12c extending in the vehicle width direction. The distance d3, from the steering axle 9 to the axis 12b of the guide wheels 12 on the vehicle end side, is longer than the distance d4 from the steering axle 9 to the axis 12c of the guide wheels 12 on the center side (d3>d4).

Figure 6:
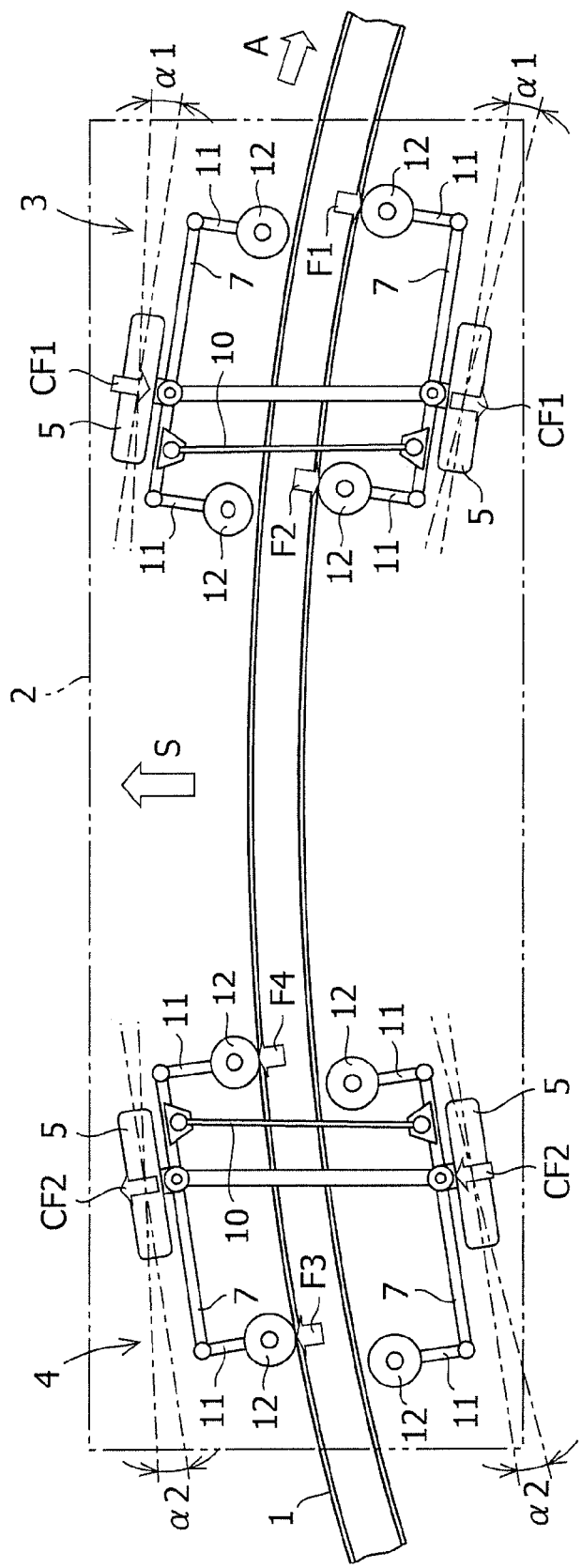
FIG. 6 is a schematic plan view showing a track vehicle that is running on a curve in a fourth embodiment of the present invention.

By this feature, when the vehicle is running on a curve, on the front wheel truck 3, a slip angle α1 is generated on the running wheel 5 as shown in FIG. 6. Therefore, the cornering force of the running wheel 5 (indicated by the arrow mark CF1) increases, and the guide wheel working force which is directed to the center guide 1 of the guide wheel 12 on the vehicle end side on the curve inside (indicated by the arrow mark F1), decreases. Similarly, the guide wheel working force, which is directed to the center guide 1 of the guide wheel 12 on the center side (indicated by the arrow mark F2), decreases.

Hereinbelow, the guide wheel working force on the front wheel truck 3 is explained. In the guide wheel 12 on the vehicle end side and on the curve inside, in the case in which the amount of a force opposing a force tending to return the vehicle state to a straight running state is taken as rf1, the amount of the centrifugal force acting on the vehicle is taken as s, and the amount of the cornering force acting on the paired running wheels 5 is taken as cf1, the amount of guide wheel working force f1 is expressed by the formula f1=rf1+s/4−2·cf1·d4/(d3+d4). In addition, in the guide wheel 12 on the center side and on the curve inside, in the case in which the amount of a force opposing a force tending to return the vehicle state to a straight running state is taken as rf2, the amount of the centrifugal force acting on the vehicle is taken as s, and the amount of the cornering force acting on the paired running wheels 5 is taken as cf2, the amount of guide wheel working force f2 is expressed by the formula f2=rf2+s/4−2·cf2·d3/(d3+d4).

When the vehicle is running on a curve, on the rear wheel truck 4, a slip angle α2 is generated on the running wheel 5 as shown in FIG. 6. Therefore, the cornering force of the running wheel 5 (indicated by the arrow mark CF2) increases, and the guide wheel working force, which is directed to the center guide 1 of the guide wheel 12 on the vehicle end side on the curve inside (indicated by the arrow mark F3), decreases. Similarly, the guide wheel working force, which is directed to the center guide 1 of the guide wheel 12 on the center side (indicated by the arrow mark F4), decreases.

The guide wheel working force on the rear wheel truck 4 is further explained. On the guide wheel 12 on the vehicle end side and on the curve inside, in the case in which the amount of a force opposing a force tending to return the vehicle state to a straight running state is taken as rf3, the amount of the centrifugal force acting on the vehicle is taken as s, and the amount of the cornering force acting on the paired running wheels 5 is taken as cf2, the amount of guide wheel working force f3 is expressed by the formula f3=rf3−s/4−2·cf2·d4/(d3+d4). In addition, in the guide wheel 12 on the center side and on the curve inside, in the case in which the amount of a force opposing a force tending to return the vehicle state to a straight running state is taken as rf4, the amount of the centrifugal force acting on the vehicle is taken as s, and the amount of the cornering force acting on the paired running wheels 5 is taken as cf4, the amount of guide wheel working force f4 is expressed by the formula f4=rf4−s/4−2·cf2·d3/(d3+d4).

As described above, according to the fourth embodiment of the present invention, since the distance d3 from the axis 12b of the guide wheels 12 on the vehicle end side to the steering axle 9, is longer than the distance d4 from the axis 12c of the guide wheels 12 on the center side to the steering axle 9, when running on a curve, the running wheels 5 tilt in the state in which the slip angle is generated. Therefore, even in the wheel trucks 3, 4 having such a simple construction, when running on a curve, the guide wheel working force directed to the center guide 1 of the guide wheel 12, can be decreased by the cornering force generated on the paired running wheels 5, and the contact pressure of the center guide 1 and the guide wheel 12 can further be decreased. Wear and deterioration of the center guide 1 and the guide wheels 12 can thereby be reduced.

Fifth Embodiment

A vehicle wheel truck according to the fifth embodiment of the present invention is explained below. The basic features of the vehicle of the fifth embodiment are the same as those of the vehicle of the fourth embodiment. The explanation is given applying the same symbols and names to elements that are essentially the same as those in the first and second embodiments. Hereinbelow, the features different from those in the fourth embodiment are explained.

Figure 7:
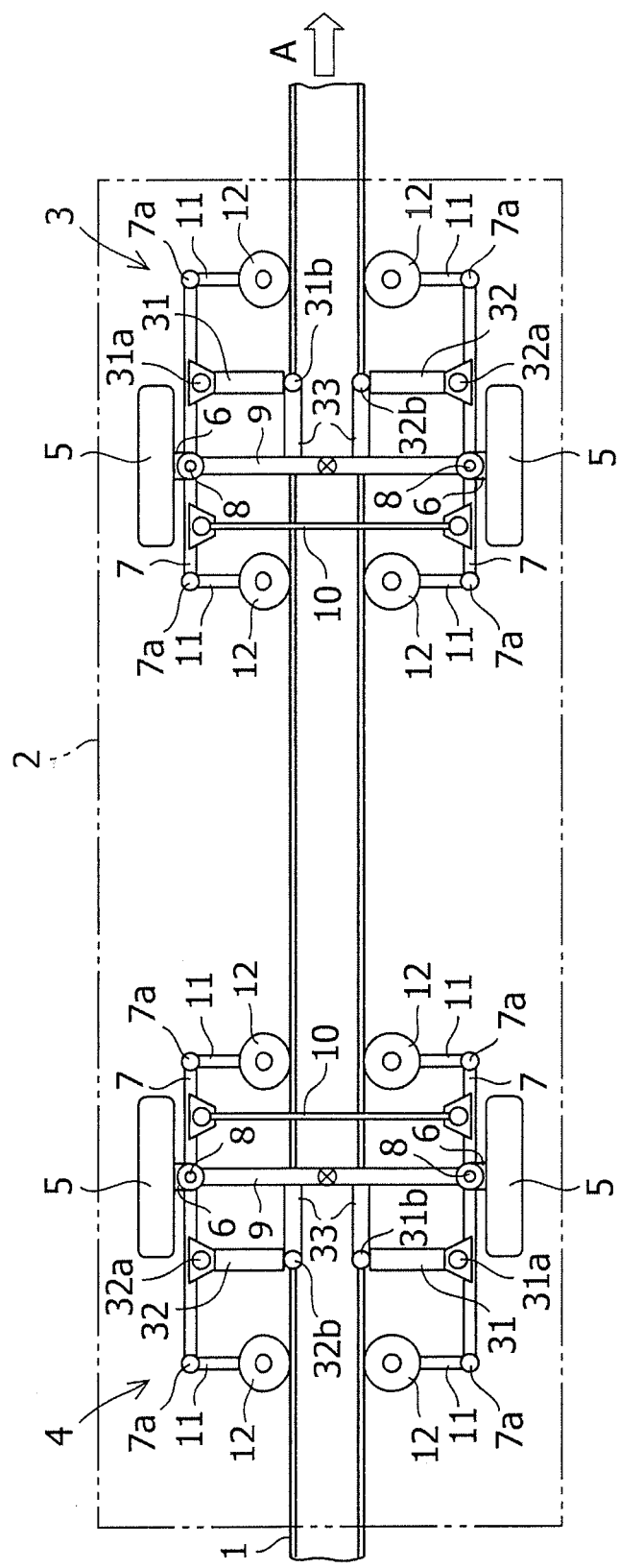
FIG. 7 is a schematic plan view showing a track vehicle that is running straight in a fifth embodiment of the present invention.

As shown in FIG. 7, the wheel trucks 3, 4 are respectively provided with the restoration rod 31, the horizontal damper 32, and the paired mounting arms 33, which are configured in the same manner as in the third embodiment. Therefore, in the fifth embodiment as well, effects that are the same as those of the third embodiment can be achieved.

The above is a description of the embodiments of the present invention. The present invention is not limited to the above described embodiments, and various modifications and changes can be made based on the technical concepts of the present invention.

The invention claimed is:

1. A track-guided vehicle wheel truck, comprising:
two running wheels provided on an identical axis;
two knuckles configured to be turned by two kingpins, respectively, and mounted on the two running wheels, respectively;
four guide wheels each configured to roll
   (i) along one of both side surfaces, in a vehicle width direction, of a center guide, or
   (ii) along one of facing side surfaces, in the vehicle width direction, of two side guides,
   wherein the center guide is positioned in a middle of the vehicle in the vehicle width direction relative to the two running wheels on a running track, and the two side guides are positioned outside the vehicle in the vehicle width direction relative to the two running wheels, respectively;
two guide frames arranged apart from each other in the vehicle width direction, arranged along a length direction of the vehicle, arranged between the running wheels in the vehicle width direction, and fixed to the knuckles, respectively;
a tie rod arranged closer to a center of the vehicle in the length direction than the identical axis, and interlocking with the guide frames;

four guide wheel receivers corresponding to the four guide wheels, respectively, and disposed between the two guide frames in the vehicle width direction, wherein two of the guide wheel receivers are on a vehicle end side and are farther from the center, in the length direction, of the vehicle than the identical axis, and the other two of the guide wheel receivers are on a center side and are closer to the center, in the length direction, of the vehicle than the identical axis; and a steering axle arranged along the vehicle width direction, and configured to turn the running wheels, the knuckles, and the guide frames by mounting the guide frames on the kingpins at both ends of the steering axle, respectively;

wherein the guide wheels are installed on distal ends of the guide wheel receivers, respectively;

wherein the running wheels are steerable along the center guide or the side guides;

wherein each of the guide wheel receivers is attached to the corresponding guide frame so as to be switched between a first condition and a second condition;

wherein, in the first condition, each of the guide wheel receivers extends from the corresponding guide frame toward the other guide frame in the vehicle width direction so that the guide wheels are rollable on the side surfaces of the center guide; and wherein, in the second condition, each of the guide wheel receivers extends from the corresponding guide frame away from the other guide frame in the vehicle width direction so that the guide wheels are rollable on the facing side surfaces of the side guides.

2. A track-guided vehicle wheel truck according to claim 1, wherein each of the guide wheel receivers is attached to the corresponding guide frame so as to be turnable between the first and second conditions.

3. A track-guided vehicle wheel truck according to claim 1, further comprising a restoration rod and a horizontal damper, wherein the restoration rod is provided along the vehicle width direction, one end of the restoration rod is attached to a corresponding one of the guide frames, the other end of the restoration rod is attached to the steering axle, the horizontal damper is provided along the vehicle width direction, one end of the horizontal damper is attached to the corresponding guide frame, and the other end of the horizontal damper is attached to the steering axle.

4. A track-guided vehicle wheel truck according to claim 1, wherein a distance in the length direction between the steering axle and a turn axis of the guide wheels corresponding to the two guide wheel receivers on the vehicle end side, is longer than a distance in the length direction between the steering axle and a turn axis of the guide wheels corresponding to the other two guide wheel receivers on the center side.

* * * * *